April 1, 1924.
E. BLUM
GAUGE
Filed Aug. 16, 1920
1,488,904
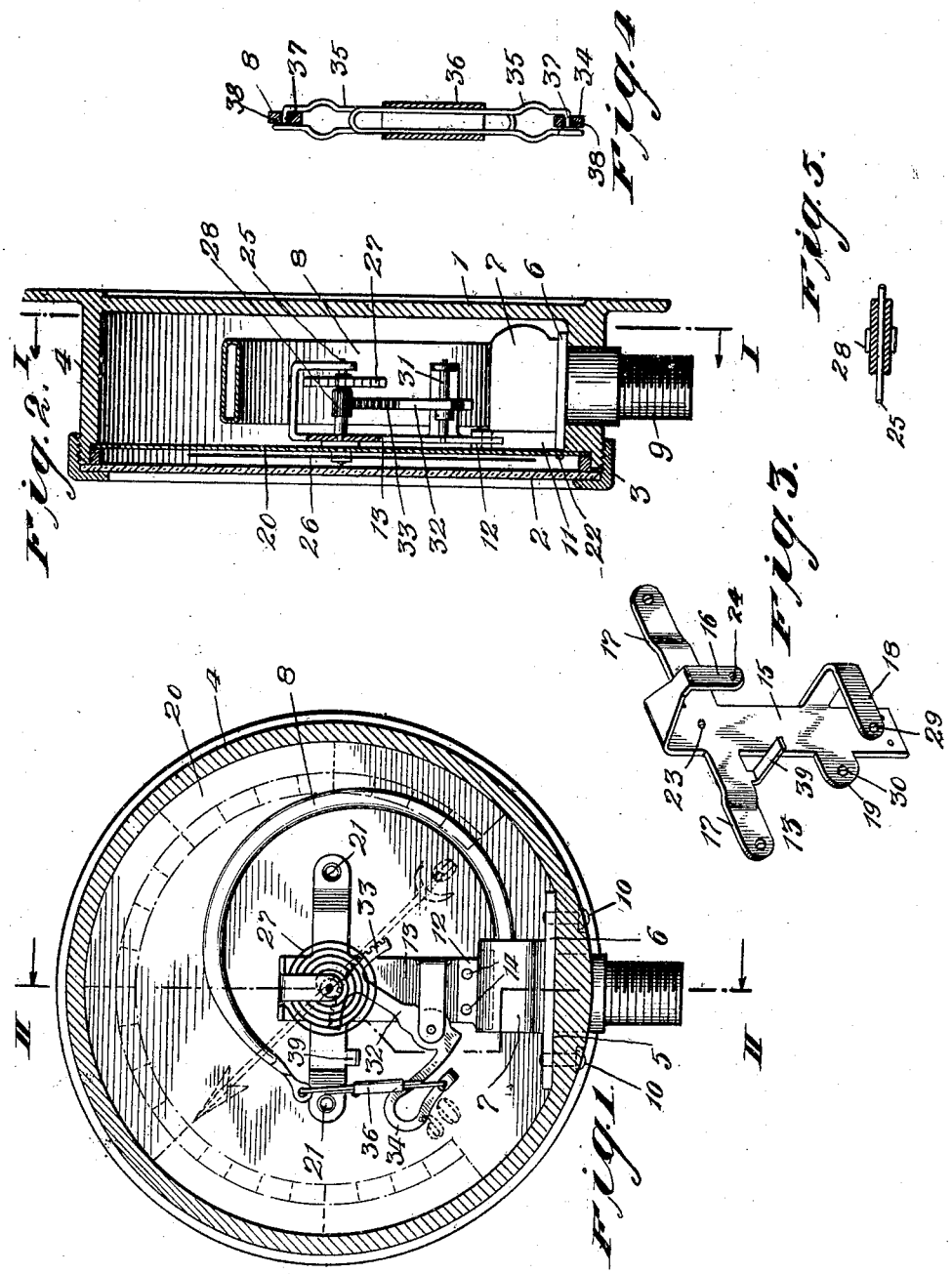
INVENTOR
Eugen Blum
BY
Moses, Hammond & Middleton
ATTORNEYS Patented Apr. 1, 1924.

1,488,904

UNITED STATES PATENT OFFICE.

EUGEN BLUM, OF VALLEY STREAM, NEW YORK, ASSIGNOR, BY MESNE ASSIGNMENTS, TO AMERICAN SCHAEFFER & BUDENBERG CORPORATION, OF BROOKLYN, NEW YORK, A CORPORATION OF NEW YORK.

GAUGE.

Application filed August 16, 1920. Serial No. 403,781.

*To all whom it may concern:*

Be it known that I, EUGEN BLUM, a citizen of Germany, residing in Valley Stream, county of Nassau, and State of New York, have invented certain new and useful Improvements in Gauges, of which the following is a specification.

This invention relates to improvements in gauges and more particularly to pressure and vacuum gauges.

In gauges of this type it is of the utmost importance that the several movable parts be maintained in their correct working positions in order that they cannot be thrown out of adjustment while in use by reason of shocks or vibrations to which they may be subjected. Heretofore, it has been the common practice in constructing gauges of this type to employ screws for connecting the several movable parts to one another and to the supporting frame therefor, and also for securing the supporting frame to the casing of the gauge. The use of screws as securing means for the parts of the gauge is objectionable however, as they tend to work loose when the gauge is subjected to shock or vibration, as is usually the case when it is in use, and as a result a shifting of the parts from their properly adjusted positions is liable to occur which causes the gauge to operate inaccurately thereby rendering it useless, or the screws may fall out of position thereby permitting the separation of the parts. This is particularly true in connection with the adjusting link which, in gauges as now constructed, is secured in the adjusted position relative to the index actuating segment by means of a screw engaging the link and the segment, for if this screw works loose the link will be free to move with respect to the segment, and of course the slightest movement of the link from its proper position will cause an inaccurate movement of the index, and the dial reading indicated by the index will not correspond to the actual pressure or vacuum to which the gauge is subjected.

In accordance with my invention the parts of the gauge are so constructed and secured to one another that the liability of their being deranged is reduced to a minimum, even though the shock or vibration to which the gauge is subjected be excessive, and there is consequently no possibility of the gauge being rendered inaccurate in use. Furthermore, the construction and arrangement of the parts permit the gauge to be accurately calibrated.

In the accompanying drawing, forming part of this application, wherein I have shown one preferred embodiment of my invention for the purpose of illustrating the principles thereof.

Figure 1 is a sectional view of a pressure gauge constructed according to and embodying my invention, the section being taken on the line I—I of Fig. 2;

Fig. 2 is a sectional view taken in the line II—II of Fig. 1;

Fig. 3 is a perspective view of the supporting frame upon which the working parts are mounted;

Fig. 4 is a detail sectional view, on an enlarged scale of the means for connecting the Bourdon spring to the segment, and Fig. 5 is a detail sectional view showing the manner in which the pinion is mounted upon its arbor.

Referring to the drawing, the gauge is shown as comprising a casing 1 having an open front closed by a transparent window 2 which is held in place by a bezel 3 threaded upon the annular wall 4 of the casing. The lower portion of the annular wall 4 is thickened somewhat to form a flat surface 5 serving as a support for a plate 6 to which is secured, preferably by soldering or brazing, the socket member 7 of a Bourdon spring 8. The nipple 9 of the socket member extends through a hole formed in the wall of the casing and has its lower end threaded for attachment to a pipe or the like communicating with the source of pressure or vacuum. The plate 6 is secured in position upon the flattened portion of the casing wall in any suitable manner, as by rivets 10. Supported upon the front portion of the plate 6 and secured thereto and to the socket member 7 by soldering or in any other suitable manner, is a block 11 having a notch 12 formed in its upper end adapted to receive the lower end of a frame 13 serving to support the working parts of the gauge and being secured to the block 11 by rivets 14.

As shown in Fig. 3, the supporting frame 13, is formed of one piece of metal and comprises a vertical body portion 15 having its upper end bent rearwardly and downwardly, as indicated at 16, and having laterally-extending arms 17 adjacent its upper end. Intermediate its ends the body portion 15 is provided at one side with a rearwardly and laterally bent arm 18, the outer end of which registers with a laterally extending lug 19 at the other side of the body portion. A dial 20 is secured to the arms 17 of the frame 13 by means of rivets 21 passing through registering holes formed in the dial and in the arms, and at its lower portion the dial is preferably secured to the plate 6 by a rivet 22. Rotatably supported within registering holes 23 and 24 formed respectively, in the body portion 15 and the rearwardly bent portion 16 of the frame, is an arbor 25 to the outer end of which is secured an index 26. A spring 27 has one of its ends secured to the frame and the other of its ends secured to the hub of a pinion 28 mounted upon the arbor 25 and secured thereto by a driving fit. In assembling the parts the pinion is positioned between the body portion and the bent end portion 16 of the frame, and the arbor is then driven through the hub of the pinion and the registering holes 23 and 24, whereupon the index 26 is secured upon the outer end of the arbor. The securing of the pinion to the arbor by a driving fit renders it possible to employ a one-piece frame.

Rotatably supported within registering holes 29 and 30, in the arm 18 and lug 19, is an arbor 31 carrying a lever 32 having at one end a segment 33 meshing with the pinion 28 and at its other end a bent arm 34, the free end of which is operatively connected to the free end of the Bourdon spring 8, as hereinafter described. By bending the arm 34 so as to increase or decrease the distance between the point of connection with the Bourdon spring and the point of pivotal support of the lever the effective length of the operating arm of the lever 32 may be increased or decreased whereby the parts may be properly adjusted to cause an accurate actuation of the index with respect to the dial. As the bent arm is integral with the lever and segment there is no danger of its being thrown out of adjustment, as for example, when the gauge is subjected to vibration, as is the case when the adjusting arm and segment lever are formed of separate parts secured to one another by a screw, which is the construction now employed in gauges of this character. The segment lever is secured to its arbor by a driving fit, as explained above in connection with the pinion 28.

The free ends of the bent arm 34 of the lever 32 and of the Bourdon spring 8 are connected to one another by a link comprising a pair of members 35 slidingly supported within a sleeve 36, and frictionally engaging the same and each other. These members 35 are formed of spring wire bent into the shape shown in Fig. 4 and have inwardly bent portions 37 at their outer ends. In placing the link in position the outer ends of the members 35 are sprung apart and the bent portions 37 are inserted within the holes 38 in the ends of the bent arm 34 and of the Bourdon spring 8 to form hinged connections therewith. When the gauge is assembled the wire members 35 of the connecting link are free to slide relatively to one another within the sleeve 36 to permit of the proper adjustment of the parts by bending the bent arm 34 as above described, or by rotating the segment lever upon its arbor whereby the effective length of the link will be automatically adjusted to correspond with the distance between the free ends of the bent arm and of the Bourdon spring. When the parts have been properly adjusted by the bending of the bent arm 34, the wire members 35 are firmly secured against relative movement and against movement with respect to the sleeve 36 by means of solder or otherwise thereby forming, in effect, a unitary connecting link which is incapable of having its length varied. Moreover the connecting link is so secured to the moving parts of the gauge with which it is associated that it can not work loose therefrom and the friction between the link and the moving parts is reduced to a minimum.

Formed integral with one of the arms 17 of the frame, is a stop 39 adapted to be engaged by the lever arm 32, if the pressure is suddenly released, whereby there will be no strain upon the index tending to bend the same or to shift its position, as is the case when the dial is provided with an outstanding pin adapted to be engaged by the index when it returns to its zero position, which is the usual arrangement in gauges as heretofore constructed. This is an important feature of the invention, for if the index is bent, or shifted with respect to its supporting arbor, by reason of its forcibly engaging the usual stop pin, should the pressure drop suddenly, it will, thereafter, give incorrect readings of the pressure to which the gauge is subjected.

To calibrate the gauge and to insure its accurate operation, the proper speed of the index hand with respect to the scale is obtained by bending the bent arm of the segment lever, and the proper positioning of the segment lever with respect to the pinion is effected by adjusting the length of the link and rotating the lever to cause the center of the segment to engage the pinion when the index hand registers with the center mark of the scale. The gauge may be conveniently calibrated in the following manner:—

The segment lever is adjusted to cause the pinion to engage the segment at one side of the central portion thereof, and the index hand is adjusted to register with the zero mark of the scale on the dial. The gauge is then subjected to a pressure corresponding to the highest pressure indicated upon the scale and the position of the index hand with respect to the scale is noted. If the index hand does not register with the high reading mark of the scale the arm 34 is bent outwardly or inwardly, as the case may be, depending upon whether the index hand did not reach the high reading or travelled past the same, and the gauge is again subjected to the same pressure. After one or more trials the position of the arm will be such that the index hand will register accurately with the high reading mark of the scale thus insuring that it will indicate properly any pressure, within the range of the scale, to which the gauge is subjected. The gauge is then subjected to a pressure equal to one half of the pressure which it is adapted to register, and the segment lever is rotated until the center of the segment is in engagement with the pinion, whereupon the index hand is adjusted relative to its arbor to register with the central mark of the scale. It is of course understood that the adjustable members of the connecting link are frictionally held against bodily movement with sufficient force to permit the operation of the gauge when it is subjected to pressure without effecting any change in the length of the link, but that such members are moved to vary the length of the link when the bent arm of the segment lever is adjusted or when the lever itself is rotated. After the gauge is calibrated, the adjustable members of the link are secured against relative movement by solder, as above described.

From the above description it will be seen that the gauge is so constructed that the possibility of any of the parts thereof being thrown out of proper adjustment is prevented, from which it follows that the gauge can with certainty be depended upon to give accurate readings of the pressure to which it is subjected. This desirable result is obtained primarily, by reason of the fact that no screws or other movable fastening means are employed for connecting the several parts of the gauge to one another whereby there are no fastening means adapted to work loose and permit the parts to be thrown out of adjustment by reason of the gauge being subjected to shock or vibration. Furthermore, by avoiding the use of movable fastening means for securing the parts to one another, the adjustment of the parts can not readily be effected by any one who intentionally or unintentionally tampers with the gauge.

While I have illustrated and described my invention in connection with a preferred embodiment thereof, it will be understood that I do not intend to limit myself to the specific embodiment shown, but that I intend to cover my invention broadly in whatever form its principle may be employed.

Having thus described my invention, I claim:—

1. In an instrument of the character described, a frame comprising a body portion having two arms extending rearwardly from and then parallel to said body portion, an index arbor journaled in the body portion of said frame and in the end of one of said arms, a pinion on said arbor, a segment lever cooperating with said pinion and journaled in the body portion of said frame and in the end of the other arm, and a pressure responsive element operatively connected to said segment lever.

2. In an instrument of the character described, a frame comprising a body portion having one end bent rearwardly and then parallel with said body portion, and having an arm extending rearwardly from and then parallel with said body portion, an index arbor journaled in the body portion of said frame and in the bent end thereof, a pinion on said arbor, a segment lever cooperating with said pinion and journaled in the body portion of said frame and in said arm, and a pressure responsive element operatively connected to said segment lever.

3. In an instrument of the character described, a frame comprising a vertical body portion having its upper end bent rearwardly and downwardly and having a rearwardly and laterally bent arm, an index arbor journaled in the body portion of said frame and in the upper bent end thereof, a pinion on said arbor, a segment lever cooperating with said pinion and journaled in the body portion of said frame and in the rearwardly and laterally bent arm, and a pressure responsive element operatively connected to said segment lever.

4. In an instrument of the character described, a frame comprising a vertical body portion having its upper end bent rearwardly and downwardly and having laterally extending arms and a rearwardly and laterally bent arm, a dial secured to said laterally extending arms, an index arbor journaled in the body portion of said frame and in the upper bent end thereof, an index secured to said arbor and cooperating with said dial, a pinion on said arbor, a segment lever cooperating with said pinion and journaled in the body portion of said frame and in the rearwardly and laterally bent arm, and a pressure responsive element operatively connected to said segment lever.

EUGEN BLUM.